United States Patent Office 3,523,754
Patented Aug. 11, 1970

3,523,754
PROCESS FOR PREPARING PHOSPHORIC ACID
Yoshito Yasutake and Yosisige Fujita, Yamaguchi-ken, Japan, assignors to Central Glass Co., Ltd., Yamaguchi-ken, Japan, a corporation of Japan
No Drawing. Filed Mar. 30, 1967, Ser. No. 626,921
Claims priority, application Japan, Apr. 2, 1966, 41/20,595
Int. Cl. C01b 25/22; C01f 1/46
U.S. Cl. 23—165  6 Claims

ABSTRACT OF THE DISCLOSURE

Highly concentrated phosphoric acid (with $P_2O_5$ content being 35% by weight or more) from phosphate rock can be obtained by first preparing a slurry of gypsum by adding phosphoric acid and sulphuric acid to phosphate rock; adding seed crystals of calcium sulfate hemihydrate to said slurry; holding the resulting mixture for a period of time and at a temperature long and high enough for the gypsum contained in said mixture to completely transform to calcium sulfate hemihydrate; and filtering this calcium sulfate hemihydrate crystals to obtain phosphoric acid and concurrently produce highly pure calcium sulfate as a by-product.

BACKGROUND OF THE INVENTION

Field of the invention

The present invention relates to a process for obtaining so-called wet-process phosphoric acid by first producing gypsum by decomposing phosphate rock with phosphoric acid and sulphuric acid, thereafter converting this gypsum to calcium sulfate hemihydrate, followed by filtering the latter crystals, the remaining filtrate being obtained as the product phosphoric acid.

Description of the prior art

As a method for preparing wet-process phosphoric acid, the process comprising decomposing phosphate rock with sulphuric acid or with a mixed acids consisting of sulphuric acid and a part of product phosphoric acid, filtering the crystals of the resulting calcium sulphate dihydrate (gypsum) and washing them with water in a filtering apparatus, to thereby obtain the remaining liquid as product phosphoric acid having a concentration of about 30% by weight, is known. (Hereinafter, the term of % by weight is indicated as %.) Also well known are the facts that calcium sulphate dihydrate thus produced contained 0.8 to 1% of $P_2O_5$ which was difficult to recover by a mere washing with water, with the result that this adhering $P_2O_5$ greatly lowered the yield of phosphoric acid, and also that a serious inconvenience was encountered when this calcium sulphate dihydrate was used as an additive for gypsum board, plaster and a setting retarder of cement or when it was used as a substitute of natural gypsum. To cope with these inconveniences, there has been proposed, for example, the following method which is designed that the decomposition of phosphate rock with mixed acids consisting of sulphuric acid and phosphoric acid is conducted at a temperature range at which the calcium sulfate hemihydrate remains stable, and the resulting slurry of calcium sulfate hemihydrate is placed into a hydration tank for conducting hydration for an extended period of time to convert it into gypsum, thereafter filtering the latter to obtain phosphoric acid and also gypsum which is obtained as a by-product. This prior method has been regarded as still unsatisfactory because said by-product gypsum still contains an amount of $P_2O_5$ of about 0.4%. These known methods invariably have another disadvantage that the majority of such product phosphoric acid have a $P_2O_5$ concentration of only 32 to 33% at most. In order to obtain phosphoric acid having a higher $P_2O_5$ concentration, various attempts have been made with very little success from industrial point of view.

SUMMARY OF THE INVENTION

After an extensive research on the manufacture of wet-process phosphoric acid, the inventors have found a method for producing, from phosphate rock, phosphoric acid having a high $P_2O_5$ concentration of 35% or more, concurrently with calcium sulphate, as a by-product, containing substantially no phosphoric acid, and in a method free from the foregoing shortcomings of the prior art. More specifically, the present invention relates to a process for producing phosphoric acid having a $P_2O_5$ concentration of 35% or more by the steps of first crystallizing gypsum by decomposing phosphate rock with phosphoric acid and sulphuric acid, thereafter converting said gypsum, which is in slurry form, to calcium sulfate hemihydrate in the presence of seed crystals consisting of calcium sulfate hemihydrate while holding said slurry at an appropriate temperature and maintaining sulphuric acid so as to be appropriately excessive in amount, and filtering the resulting calcium sulfate hemihydrate, the filtrate being the product phosphoric acid having a high $P_2O_5$ concentration of 35% or more, and concurrently producing highly pure calcium sulfate hemihydrate by washing said hemihydrate with water. Description of the present invention will be made hereunder in further detail.

Phosphate rock pulverized to such size that 60 to 80% of it passes through Tylar standard sieve of 100 mesh is mixed with phosphoric acid (recycled phosphoric acid) having relatively low $P_2O_5$ concentration which is recovered during the final filtering-washing step and also with a part of the slurry-form gypsum (recycled one) obtained from the reaction between sulfuric acid and the reaction product of said phosphate rock and said phosphoric acid, to first render a greater part of the phosphate rock soluble as the result of its reaction with the phosphoric acid, and thereafter adding sulphuric acid to the resultant slurry to thereby produce gypsum. It is to be noted that the aforesaid recycled phosphoric acid and slurry-form gypsum may be supplied in a quantity which is sufficient to render the greater part of the phosphate rock soluble as calcium dihydrogen phosphate due to the reaction between the phosphate rock and the phosphoric acid added thereto. There is imposed no particular restriction on the quantity of the recycled slurry form gypsum used. It may be about the same as or more than the quantity of the slurry supplied to the following reforming step. With respect to the quantity of the recycled phosphoric acid used, it is to be noted that an excessively small quantity of recycled phosphoric acid will lead to an increase in the slurry concentration in the aforesaid gypsum production step and make the operation difficult to perform, while on the other hand, an excessively large quantity of recycled phosphoric acid will disadvantageously over-reduce the slurry concentration. The optimum proportion of the quantity of the added phosphoric acid is in the range, of from 15 to 40%.

Next, sulphuric acid is added to the slurry resulting from the reaction between the greater part of the phosphate rock and the phosphoric acid and containing calcium dihydrogen phosphate and gypsum. In view of the fact, however, that an increase in the concentration of phosphoric acid generally induces, deepnding on the reaction temperature employed, the crystallization of calcium sulfate hemihydrate and hampers the formation of gypsum, it is important to supply sulphuric acid in such quantity that the proportion of its surplus quantity is held at as small a percentage as possible, and that it is preferred to restrain its quantity within 3% in terms of $SO_3$ relative to the content of calcium. It is also important that seed crystals of gypsum are present in this step. Also important is that the reaction temperature be restricted to 80° C. or lower, and preferably, the reaction temperature is held at a level ranging from 60° C. to 75° C. When gypsum is formed according to the foregoing process and conditions, it is possible to effect stable crystallization of gypsum even from such a highly concentrated phosphoric acid as having a $P_2O_5$ concentration ranging from 40 to 45%. The gypsum thus obtained consists, in most instances, of very fine crystals, and accordingly, it is quite difficult to filter them out and wash them with water. Moreover, the crystals contain a considerable amount of adhering $P_2O_5$ which cannot be removed by a mere washing with water. A part of the gypsum slurry resulting from the crystallization during the reaction between calcium dihydrogen phosphate and sulphuric acid is used, as a recycle slurry, in the reaction of the first stage, namely, the reaction between phosphate rock and phosphoric acid. In order to maintain the respective reaction vessels at predetermined temperatures during the foregoing operation, said recycle slurry is supplied to a cooler held under a reduced pressure to thereby cool down the slurry before being returned to the first vessel where the phosphate rock is reacted with phosphoric acid, or air is introduced into the respective vessels so as to obtain controlled, temperatures.

The remainder of the gypsum slurry is supplied to the reforming step. In this reforming step, gypsum is transformed into calcium sulfate hemihydrate and is recrystallized in the presence of a large amount of seed crystals of calcium sulfate hemihydrate while controlling the concentration of the surplus quantity of supplied sulphuric acid and maintaining the gypsum slurry at or above the temperature at which the gypsum transforms into calcium sulfate hemihydrate. The seed crystals of calcium sulfate hemihydrate used in this step may consist of such crystals which are prepared separately from the decomposition of phosphate rock carried out in mixed acids of sulphuric acid and phosphoric acid at a high temperature, or may consist of such crystals as are obtained by adding sulfuric acid to a part of the gypsum slurry formed in the process of the present invention and converting the gypsum to calcium sulfate hemihydrate, or may consist of such crystals as are obtained by adding sulphuric acid to a separately prepared slurry-form suspension of appropriate gypsum in phosphoric acid, heating the resulting mixture at or above the temperature at which gypsum transforms into calcium sulfate hemihydrate, thereby transforming the gypsum to calcium sulfate hemihydrate. Alternately, one may recycle thoroughly converted calcium sulfate hemihydrate as the seed crystals. Furthermore, one may rely on the method of introducing gypsum little by little into a large quantity of seed crystals of calcium sulfate hemihydrate contained in a vessel of a large capacity (in this instance, there is no need of adding fresh seed crystals). In case it is desired to obtain seed crystals of calcium sulfate hemihydrate by decomposing phosphate rock directly in mixed acids of sulphuric acid and phosphoric acid while maintaining the mixture at a high temperature, it is preferred that the total concentration of sulphuric acid and phosphoric acid as the total in terms of $SO_3$ and $P_2O_5$ be controlled so as to be maintained in the range of from 30 to 50% and that the $SO_3$ concentration be maintained at 3% or more and that the mixture be held at or above the temperature at which calcium sulfate hemihydrate is formed. Also, when it is desired to obtain seed crystals of calcium sulfate hemihydrate from gypsum slurry formed in the process of the present invention or a separately prepared slurry-form suspension of gypsum in mixed acids, it is advantageous to rapidly increase the temperature of the gypsum slurry or the slurry-form suspension to a level of at least 10° C. to 20° C. or higher than the temperature at which gypsum is converted into calcium sulfate hemihydrate while severely stirring the mixture and controlling the total concentration of sulphuric acid and phosphoric acid in terms of $SO_3+P_2O_5$ so as to be in the range of from 30 to 50%, with the $SO_3$ concentration being maintained at 2% or more, because the formation of calcium sulfate anhydride as a by-product is thereby completely avoided and because stable formation of seed crystals of calcium sulfate hemihydrate can thereby be achieved. By mixing such seed crystals with the initiail gypsum slurry while holding the mixture at or above the temperature at which gypsum transforms into calcium sulfate hemihydrate and further by controlling the concentration of sulphuric acid so as to be in the range of from 3 to 10% in terms of $SO_3$ content in the liquid phase of the slurry, the gypsum contained in the slurry will gradually become dissolved leading to the growth of seed crystals of calcium sulfate hemihydrate having a large size which is in the order of $60\mu$ in width and $300\mu$ in length, or larger than that. The preservation temperature which is necessary to effect the transformation of gypsum into calcium sulfate hemihydrate, preferably, is 75° C. or above where the concentration (in terms of $P_2O_5+SO_3$ content) of the liquid phase is 40%, and 70° C. or more when said concentration is 45%, and 65° C. or more when the concentration is 50%.

A part of the slurry of calcium sulfate hemihydrate completely converted by the foregoing treatment is recycled, while the majority part of the remainder is supplied to an appropriate filter to separate phosphoric acid, and the remaining calcium sulfate hemihydrate is thoroughly washed with water. Thus, the separated liquid which is a phosphoric acid having a high $P_2O_5$ concentration of 35% or more is obtained. The calcium sulfate hemihydrate having a tremendously large particle size which has been recovered by filtering and washing is extremely stable in nature and will not convert into gypsum in a short period of time even when it is filtered and washed with water in an ordinary filtering apparatus and accordingly will never block the meshes of the filter cloth. Thus, one can carry out the filtering and washing with water of the product calcium sulfate hemihydrate without any fear of its transformation into gypsum. Moreover, because the crystals of the obtained calcium sulfate hemihydrate hardly contain $P_2O_5$ or have any $P_2O_5$ fixed therein, the calcium sulfate hemihydrate may be used as a setting retarder of cement after being transformed into gypsum by the addition of water thereto. While the present invention permits the manufacture of phosphoric acid having a high $P_2O_5$ concentration as has been described, it is needless to say that the present invention can be applied also to the manufacture of phosphoric acid having an ordinary $P_2O_5$ content in the order of 28% to 33%.

DESCRIPTION OF THE PREFERRED EMBODIMENTS

Example 1

Reaction vessels consisting of 5 vessels each having a capacity of 0.4 m.³ and equipped with a stirrer were connected so that a liquid could flow from one vessel into another. Phosphate rock ($P_2O_5$ content being 34.5%) was added into the first vessel at the rate of 72.5 kg. per hour, while supplying thereto recycled phosphoric acid at the rate of 233 kg. per hour and also was recycled slurry thereto at the rate of 700 kg. per hour. Thus, a part of the phosphate rock was first decomposed with phosphoric acid. Thereafter, the decomposed phosphate rock was added with 98% sulphuric acid at the rate of 56.6 kg. per hour in the second vessel to crystallize gypsum as the result of reaction therebetween. Since the temperature of the gypsum slurry in this vessel increased due to the reaction temperature, a liquid was circulated to a cooler held under a reduced pressure to thereby maintain the temperature in the range of from 65° C. to 70° C. The phosphoric acid recycled to the first vessel consisted of 184.5 kg. of product phosphoric acid partly taken after the final calcium sulfate hemihydrate was filtered and of 48.5 kg. of diluted phosphoric acid which was the filtered liquid recovered when the calcium sulfate hemihydrate was washed and which contained a considerable amount of phosphoric acid ($P_2O_5$ content being 30.2%). A part, namely, 700 kg. of the gypsum slurry thus obtained from the second vessel was recycled to the first vessel, and another part, namely, 7.5 kg. of the slurry was supplied to a separate stirring vessel for producing seed crystals of calcium sulfate hemihydrate, said vessel having a capacity of 20 liters, to which was added 1.4 kg. of 98% sulphuric acid, and while maintaining the temperature at or above 80° C. by introducing steam thereto, gypsum was transformed into calcium hemihydrate. The resulting calcium sulfate hemihydrate was added, as seed crystals, to the initial gypsum slurry contained in the third vessel. 9.9 kg. of sulphuric acid was added to the mixed slurry consisting of gypsum slurry and seed crystals of the hemihydrate contained in the third vessel to thereby accelerate the transformation of gypsum calcium into sulfate hemihydrate. Steam was introduced into this third vessel to maintain the temperature at 80° C. The slurry was then passed through to the fourth and to the fifth vessels successively which were held under the condition same as that of the third vessel. The gypsum contained in the mixed slurry had completely transformed into calcium sulfate hemihydrate in the fifth vessel, and thus, calcium sulfate hemihydrate slurry was obtained at the rate of 378 kg. per hour. By filtering the resulting slurry, 246 kg. of product phosphoric acid ($P_2O_5$ content 40.6%, $SO_3$ content 4.9%) was obtained. Next, unwashed calcium sulfate hemihydrate to which phosphoric acid still adhered was washed with 29.3 liters of water, and as a result, 112.8 kg. of calcium sulfate hemihydrate (the adhering water being 15% and $P_2O_5$ content being 0.16%) and 48.5 kg. of filtrate having a concentration of 30.2% $P_2O_5$ were obtained. This filtrate was recycled together with a part of the product phosphoric acid so as to be used again as the phosphoric acid for the initial reaction.

Example 2

After the slurry of calcium sulfate hemihydrate which had been completely converted from the gypsum slurry started flowing out from the fifth vessel in Example 1, both the preparation and the supply of seed crystals were suspended. Instead, the calcium sulfate hemihydrate slurry discharged from the fifth vessel was recycled, as seed crystals, to the third vessel at the ratio of 350 kg. per hour. A result similar to that in Example 1 was obtained.

Example 3

The third vessel in which conversion into calcium sulfate hemihydrate was conducted in Example 2 and the subsequent vessels were substituted by a single vessel having the capacity of 1.5 m.³. Gypsum slurry discharged from the second vessel was introduced into a large amount of slurry consisting substantially of calcium sulfate hemihydrate alone while stirring. Thus, a similar result was obtained.

What is claimed is:

1. A process for preparing phosphoric acid and calcium sulfate hemihydrate by the acid conversion of phosphate rock, comprising the steps of:
    (a) adding dilute phosphoric acid obtained in the following step (e) and a slurry of gypsum obtained in the following step (b) to phosphate rock whereby to produce a reaction mixture containing calcium dihydrogen phosphate,
    (b) adding sulfuric acid to said reaction mixture whereby to produce a slurry comprised of phosphoric acid and gypsum of relatively fine particle size,
    (c) recycling a portion of said slurry to step (a) and admixing calcium sulfate hemihydrate seed crystals with the remainder of said slurry, without removing phosphoric acid from said remainder of said slurry, thus to form a conversion reaction mixture which contains phosphoric acid of a high $P_2O_5$ content,
    (d) for a period of conversion, controlling the sulfuric acid content within the limits of 3 to 10%, based on $SO_3$, of the total weight of the liquid phase of the said conversion mixture, and for the period of conversion heating the said conversion mixture at a level sufficient for said gypsum to convert into calcium sulfate hemihydrate crystals, and,
    (e) separating the formed crystals of calcium sulfate hemihydrate and then recovering product phosphoric acid having a $P_2O_5$ content of at least about 35% by weight from said separating stage, washing with water said separated crystals of calcium sulfate hemihydrate, and recovering dilute phosphoric acid from said washing stage.

2. A process for preparing phosphoric acid according to claim 1, wherein the amount of the sulphuric acid for the reaction of the formation of gypsum slurry in said step (b) is in the range of from being equivalent to over-equivalent relative to the content of the calcium contained in said phosphate rock, with the proportion of the surplus of said over-equivalent amount of said sulphuric acid not exceeding 3% in terms of $SO_3$ relative to the amount of said calcium.

3. A process for preparing phosphoric acid according to claim 1, wherein calcium sulfate hemihydrate produced from a reaction between phosphate rock and mixed acids consisting of sulphuric acid and phosphoric acid is used as seed crystals of calcium sulfate hemihydrate, said reaction being carried out under the conditions: that the total concentration of the phosphoric acid, and the sulphuric acid, measured as $SO_3+P_2O_5$, is in the range of from 30 to 50% by weight with the $SO_3$ content thereof being not lower than 3% by weight and that said reaction is carried out at a temperature range and for a length of time sufficient to cause the transformation of gypsum into calcium sulfate hemihydrate.

4. A process for preparing phosphoric acid according to claim 1, wherein a part of the calcium sulfate hemihydrate obtained from said step (d) is recycled as seed crystals of calcium sulfate hemihydrate which are to be added to said gypsum slurry.

5. A process for preparing phosphoric acid according to claim 1, wherein said mixed slurry is held at a temperature not lower than 75° C. when the total concentration of $P_2O_5$ plus $SO_3$ of said slurry in its liquid phase is 40%, and said slurry is held at a temperature not lower than 65° C. in case the aforesaid total concentration is 50%.

6. A process for preparing phosphoric acid according to claim 1, wherein said gypsum slurry is continuously supplied to a vessel containing a large amount of calcium sulfate hemihydrate which has been already transformed from gypsum so as to utilize said already formed calcium sulfate hemihydrate as seed crystals.

References Cited

UNITED STATES PATENTS

| | | | |
|---|---|---|---|
| 2,710,247 | 6/1955 | Knowles et al. | 23—165 |
| 2,897,053 | 7/1959 | Svanoe | 23—165 |
| 3,416,887 | 12/1968 | Matsubara et al. | 23—122 |

FOREIGN PATENTS

| | | |
|---|---|---|
| 1,409,248 | 8/1965 | France. |
| 1,453,399 | 9/1966 | France. |

HERBERT T. CARTER, Primary Examiner

U.S. Cl. X.R.

23—122